United States Patent [19]

Silver et al.

[11] Patent Number: 4,972,359

[45] Date of Patent: Nov. 20, 1990

[54] DIGITAL IMAGE PROCESSING SYSTEM

[75] Inventors: William M. Silver, Medfield; Robert A. Wolff, Lexington; Ronald E. Dynneson, Newton, all of Mass.

[73] Assignee: Cognex Corporation, Needham, Mass.

[21] Appl. No.: 34,781

[22] Filed: Apr. 3, 1987

[51] Int. Cl.$^5$ .............................................. G06F 15/70
[52] U.S. Cl. ............................... 364/728.05; 364/518; 382/18; 382/42; 382/51
[58] Field of Search ............... 364/718, 728, 735, 747, 364/518, 728.05; 382/18, 31, 42, 51

[56] References Cited

U.S. PATENT DOCUMENTS

| | | | |
|---|---|---|---|
| 3,816,722 | 6/1974 | Sakoe et al. | 364/728.05 |
| 3,967,100 | 6/1976 | Shimomura | 364/735 |
| 3,978,326 | 8/1976 | Shimomura | 364/735 |
| 4,200,861 | 4/1980 | Hubach et al. | 340/146.3 Q |
| 4,300,164 | 11/1981 | Sacks | 358/163 |
| 4,385,533 | 5/1983 | Hubach et al. | 358/221 |
| 4,581,762 | 4/1986 | Lapidus et al. | 382/22 |
| 4,606,065 | 8/1986 | Beg et al. | 382/18 |
| 4,742,551 | 5/1988 | Deering | 382/18 |

Primary Examiner—Gary V. Harkcom
Assistant Examiner—Mark K. Zimmerman
Attorney, Agent, or Firm—Lahive & Cockfield

[57] ABSTRACT

A digital image processing system provides convolution, correlation and normalized correlation functions, without per-pixel multiplication operations, utilizing factorization and moment generation. A first memory array is addressed by image pixel values, and a second memory array is addressed by template pixel values. Logic and control elements increment the array element addressed by the image pixel value, and add the image pixel value to the array element addressed by a corresponding template pixel value. The resulting sums in the first and second arrays are processed to generate convolution and correlation functions.

18 Claims, 2 Drawing Sheets $$\begin{pmatrix} 1 & 0 & 0 & 0 & & 0 & 0 \\ 0 & \tbinom{1}{1} & 0 & 0 & \cdots & 0 & 0 \\ 0 & \tbinom{2}{2} & \tbinom{2}{1} & 0 & & 0 & 0 \\ 0 & \tbinom{3}{3} & \tbinom{3}{2} & \tbinom{3}{1} & & 0 & 0 \\ & \vdots & & & \ddots & & \vdots \\ 0 & \tbinom{k-1}{k-1} & \tbinom{k-1}{k-2} & \cdots & & \tbinom{k-1}{2} & \tbinom{k-1}{1} \end{pmatrix}$$

TRANSFORM MATRIX: k ACCUMULATORS TO k MOMENTS $$\begin{pmatrix} 1 & 0 & 0 \\ 0 & 1 & 0 \\ 0 & 1 & 2 \end{pmatrix}$$

TRANSFORM MATRIX FOR k = 3

DIGITAL IMAGE PROCESSING SYSTEM

BACKGROUND OF THE INVENTION

This invention relates to digital signal processing devices and, in particular, provides methods and apparatus for efficient digital processing of signals. The invention can be practiced in connection with any of a large number of digital signal generating devices, including, but not limited to, audio equipment, television cameras, electron microscopes, and radar.

Digital image processing devices are digital signal processors used to process signals generated, for example, by a television camera. Here the signals to be processed are referred to as images, and the individual digital values of the signals are referred to as pixels.

Digital image processing devices are used as a foundation on which to build machine vision devices, which are of great practical importance in industrial automation and other areas where machines must make decisions based on visual input. Such devices are typically used to locate patterns for alignment, to measure distances, angles, and other critical dimensions, to guide robots, to inspect the quality of manufactured items, and to identify unknown objects. The digital image processors upon which machine vision devices are built must perform a variety of computations rapidly and inexpensively, including convolution, correlation, normalized correlation, spatial averaging, histograms, projections, and spatial moments.

Convolution is used to enhance images for further processing. Correlation and normalized correlation, which are mathematically similar to convolution, provide the basis for locating and judging the quality of specific features in images of objects.

Spatial averaging is used to reduce the resolution of an image by averaging blocks of pixels. Spatial averaging is used to reduce Processing time in situations where portions of an image are over-resolved. It is also useful for noise reduction and allows trading off spatial resolution for intensity resolution.

A histogram gives the frequency of occurrence of each of the intensity values present in an image. Histograms are useful for computing various statistical properties of an image, including range, mean, and variance.

A projection of an image onto a line is computed by summing the image pixels in strips perpendicular to the line. Projections have a variety of uses, including efficient computation of spatial moments: area, center of mass, principal moments of inertia, and principal axes of inertia.

An image processing device used in a machine vision system must be able to process pixels very rapidly. To perform the above-described operations, and in particular, correlation and convolution, prior art devices rely on expensive, specialized hardware. The resulting high costs to the end users of the devices have slowed the introduction of machine vision systems into practical industrial applications.

There accordingly exists a need for a digital image processor that provides rapid yet inexpensive processing of images.

It is therefore an object of this invention to provide a method and apparatus for digital image processing that can process images rapidly, using simple and inexpensive hardware.

It is a further object of this invention to provide a method and apparatus for performing convolution, correlation, and normalized correlation that requires fewer arithmetic operations per pixel than prior art devices, and where the traditional multiplication operations are eliminated.

SUMMARY OF THE INVENTION

The invention discloses a method and apparatus for performing the above-described operations, among others, using inexpensive hardware. The invention performs all of the operations by a method wherein image pixels are grouped into bins corresponding to intensity values or spatial coordinates, under control of model pixels.

The image pixels are used to address a first memory array, referred to as the energy array. The model pixels are used to address a second memory array, called the correlation array. The device has arithmetic and control elements that can increment the energy array element so addressed, and add the image pixel to the correlation array element so addressed. After providing an appropriate stream of image and model pixels, the resulting sums in the energy and correlation arrays are further processed to produce one or more of the above-described functions.

The invention further discloses a method and apparatus for executing convolution, correlation, and normalized correlation without per-pixel multiplication operations, wherein said functions are executed by factorization and moment generation.

The cost savings possible with the invention are due in part to its simplicity, and in part to the ability to perform a wide variety of important operations using the pixel grouping method.

The invention will next be described in connection with certain illustrated embodiments. However, it should be clear that various changes, modifications and additions can be made by those skilled in the art without departing from the scope of the invention as defined in the claims. In particular, the invention is described in connection with embodiments which perform image processing functions. It will be apparent to those skilled in the art, however, that the invention can be practiced in a variety of other digital signal processing embodiments, including audio and radar signal processing implementations.

BRIEF DESCRIPTION OF DRAWINGS

For a fuller understanding of the nature and objects of the invention, reference should be made to the following detailed description and the accompanying drawings in which.

DESCRIPTION OF ILLUSTRATED EMBODIMENTS

Figure 1:
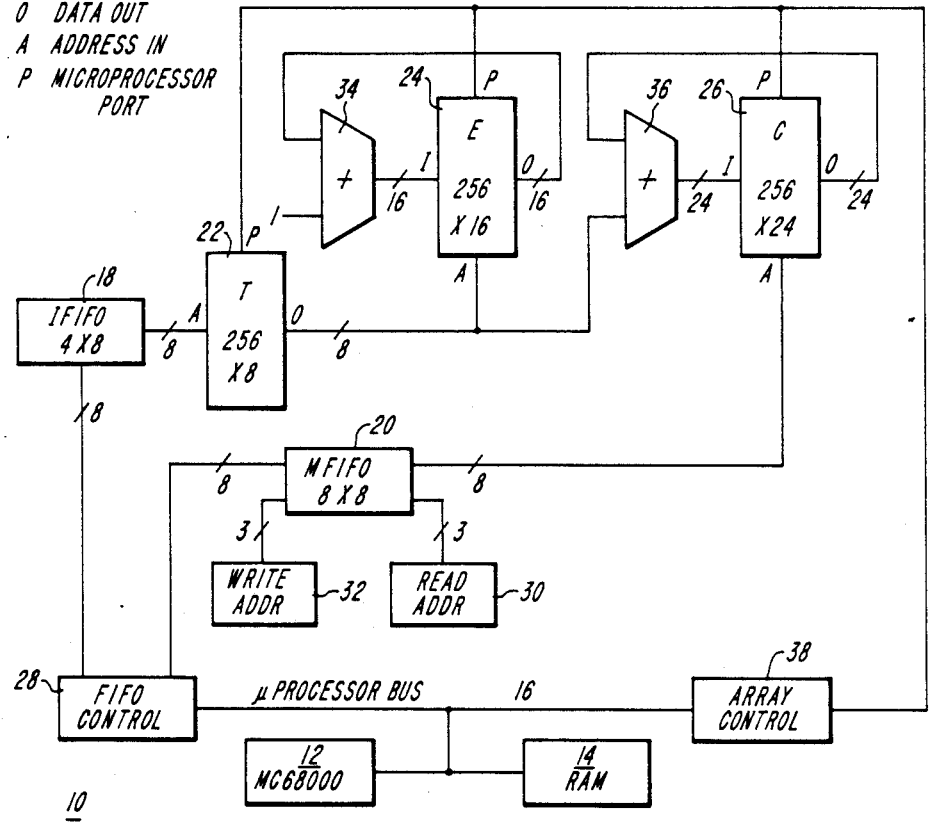
FIG. 1 is a block schematic diagram of a digital image processor in accordance with the invention.

A block diagram of a preferred embodiment of the invention is shown in FIG. 1. The illustrated system preferably performs all of the operations involved in computing several important digital signal processing functions. A preferred embodiment of the invention is adapted to perform image processing functions on pixel values. In a further preferred embodiment, all pixels are represented by 8-bit unsigned numbers. The illustrated system 10 is built around a general purpose computing element 12 and associated memory 14. In one embodiment of the invention, the processor unit is a Motorola MC68000 processor with 2Mb of zero wait state memory operating at 12.348 Mhz. MC68000 program code utilized in connection with this preferred embodiment of the invention is set forth and incorporated herein as Appendix A.

The system 10 examines memory reads and writes on the microprocessor bus 16 for special codes in two high order address bits. Those bits are not decoded by the memory, so all memory references operate independently of the state of those bits. The codes are used to cause the system 10 to operate on the data read out of or written into the memory. Each byte read or written corresponds to one pixel. If a single bus transaction refers to more than one pixel, all of the referenced pixels are processed, in increasing byte address order.

The system 10 distinguishes between two types of pixels—image pixels (I) and model pixels (M). The pixel type for a given bus transaction is determined by the special address code. The I pixels come from the image to be processed. The M pixels are selected based on the operation being performed.

A digital signal processing apparatus according to the invention has a pair of first-in, first-out (FIFO) buffers referred to as the I-FIFO 18 and M-FIFO 20, respectively, that hold the I and M pixels extracted from the specially tagged bus transactions and that present the pixels in sequence to the execution unit. The M FIFO 20 is special in that it can hold a pattern of M pixels to be repeated indefinitely, so that no time is wasted in reiteratively loading the M FIFO 20 in cases where a simple pattern of pixels is appropriate.

A preferred embodiment of the invention has three 256-element arrays known as the translation (T) array 22, the energy (E) array 24, and the correlation (C) array 26. The T array 22 specifies a pixel mapping function that maps every I pixel before the I pixel is used by the arithmetic elements. The E and C arrays 24 and 26, respectively, accumulate results.

The FIFO control unit 28 extracts M or I pixels from the specially tagged bus transactions and loads them into the appropriate FIFO. The I FIFO 18 is a simple first-in first-out buffer, four elements deep in a preferred embodiment. The I FIFO is emptied one pixel at a time by the execution unit whenever it is non-empty, as described in the following section. If the I FIFO 18 fills up, the FIFO control unit 28 will insert wait states into any bus transaction tagged as I pixels, until sufficient room is made to hold all of the pixels specified in the transaction.

The M FIFO 20 is used as a first-in first-out buffer, or it can be used to generate a repeating pattern of M pixels. It can be viewed as a ring buffer with separate read and write pointers. The FIFO control unit 28 writes each pixel to the ring element specified by the write pointer and the pointer is advanced after each pixel. Whenever the execution unit fetches an I pixel for processing, the read pointer is used to fetch an M pixel and is then advanced. If system 10 is operated so that one M pixel is loaded for every I pixel, the M FIFO 20 will operate like a first-in first-out buffer. Alternatively, the M FIFO 20 can be loaded with an appropriate pattern and the read pointer will repeatedly fetch that pattern.

In one embodiment, the M FIFO 20 holds eight pixels and the read and write pointers 30 and 32, respectively, are 3 bit counters.

The execution unit performs all of the pixel operations. Each cycle of the execution unit consumes one I pixel and one M pixel from the appropriate FIFO's. The execution unit runs whenever the I FIFO 18 is non-empty.

In the illustrated system, each execution unit cycle does the following:

(1) One I and one M pixel are fetched from the FIFO's. The I pixel is translated by looking up a value in the T array 22. The result is referred to as I'.

(2) If the M pixel value is 255, the cycle ends. Such M pixels are called "don't care" codes.

(3) The E array element addressed by I' is incremented.

(4) The value I' is added to or subtracted from the C array element addressed by the M pixel value, under control of the special two bit address codes. The codes are as follows: 0: "no operation"; 1: load M pixel; 2: load I pixel for addition; and 3: load I pixel for subtraction.

In a preferred embodiment of the invention, the system may be configured so that the special address code for loading an I pixel is expanded to two codes, one for I pixels to be added to the C array 26 and one for I pixels to be subtracted from the C array. In such a system, the I FIFO is made one bit wider to hold the operation code for each I pixel, and the adder 36 is replaced with an adder/subtracter or general purpose ALU.

In another embodiment, the E array 24 is 16 bits wide and the C array 26 is 24 bits wide, allowing 65,536 pixels to be processed without the possibility of overflow. In practice, many more pixels can typically be processed without overflow.

In a further preferred embodiment, the two adders 34 and 36 shown in FIG. 1 are implemented as a single 8-bit adder. The full 16-bit E array and 24-bit C array sums are computed serially by incrementing the next high order byte of the sum if a carry was generated by the previous byte. When the invention is practiced in connection with an MC68000 processor, the execution unit cycle takes three MC68000 clock cycles plus 1 clock cycle for each carry. In most applications, carries occur in a small fraction of the cycles, so the effective machine cycle time is slightly over 3 clock cycles.

As discussed above, the M FIFO can be operated in one of two ways—as a FIFO or to repeat a pattern of M pixels. When operated as a FIFO, an M pixel is loaded for each I pixel. In a system utilizing an MC68000 processor, the fastest way for the processor 12 to load both pixel streams is with a COMPARE MEMORY LONG instruction, such as:

cmpm.l(a0)+,(a1)+

This instruction uses one address register (a1 in this example) to point to the I pixels and one address register (a0) to point to the M pixels. The address held in (a1) has the special address bit set to tag the bus transactions as I pixels; similarly for a0. The M pixels must be loaded before the I pixels, so the order of the bus transactions generated by the cmpm.l instruction must be known. The instruction fetches an entire source operand first, then the destination. The operands are fetched as high order 16 bits first, then low order. The cmpm.l instruction takes 20 clock cycles, i.e. five clock cycles per pixel pair. Since the execution unit only needs three clock cycles per pixel pair, the processor 12 never has to wait. Thus, the theoretical maximum speed for an MC68000 based system with the M FIFO 20 operating in FIFO mode is five clock cycles per pixel. In practice, such a system can get within a few percent of this theoretical limit.

With the M FIFO 20 operating in pattern mode, the fastest way to load the I pixels in a MC68000 based system is also with a cmpm.l instruction:

cmpm.l (a0)+,(a0)+

In this example, (a0) points to the I pixels. The instruction takes 20 clock cycles, or 2.5 clock cycles per pixel. Here the execution unit cannot keep up and so the processor 12 occasionally has to wait. The theoretical maximum speed for the invention with the M FIFO 20 operating in pattern mode is 3 clock cycles per pixel.

Many other instructions besides cmpm.l are useful for operating the illustrated system. For example, one can use MOVE instructions to copy an image while simultaneously processing its pixels.

The array control unit 38 provides direct access to the array elements 22, 24 and 26 by the microprocessor 12. It causes the elements of each of the three arrays 22, 24 and 26 to appear in the microprocessor's address space so that the array elements can be read and written. In one embodiment of the invention, reading any array element also zeros it. Another embodiment of the invention provides a command to clear the entire E and C arrays 24 and 26 in one step.

If the I FIFO 18 is not empty when the microprocessor 12 tries to reference an array element, the array control unit 38 inserts wait states into the bus transaction until the I FIFO empties. Any reference to an array element by the microprocessor 12 resynchronizes the M FIFO 20 by setting the write pointer 32 equal to the read pointer 30.

Figure 2:
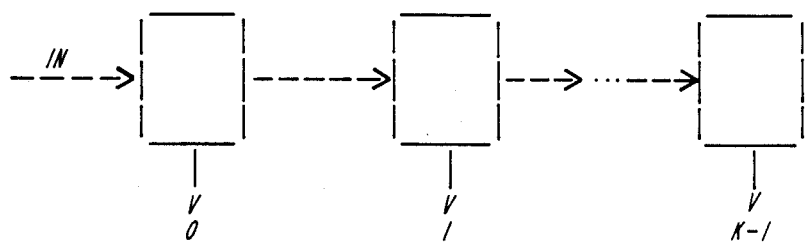
FIG. 2 is a block diagram of moment generation by cascaded accumulators provided by the system of FIG. 1.

The results of an image pixel processing function are held in the E and C arrays 24 and 26. In some operations these arrays are the final desired results, but more often the arrays are further processed to produce the desired results. The most important postprocessing step is moment generation, where the goal is to compute moments, typically the first three moments (0th, 1st, and 2nd), of the arrays. In an embodiment utilizing a 256 element E array, the kth moment of the E array is:

$$E_k = \sum_{i=0}^{255} i^k E(i), \quad (1)$$

and similarly for C. The moments are computed by the microprocessor 12 using a technique based on cascaded accumulators. To compute the first k moments of E or C, k accumulators numbered 0 thru k-1 are cascaded as shown in FIG. 2. Referring now to FIG. 2, each of a plurality of accumulators, designated 0 through k-1, receives digital input from a corresponding adder element, designated with a "+", while the output of each accumulator is fed back to the corresponding adder element through a feedback path. The output of each accumulator unit then becomes an input for a succeeding accumulator unit.

Moments are generated by first zeroing the accumulators and then, for each element of E or C starting with 255 and working backwards to zero, adding the array element to accumulator [0], adding the result to accumulator 1, and so on until the result in accumulator k-2 is added to accumulator k-1. On the last iteration, corresponding to array element [0], the procedure terminates after adding to accumulator [0]. The higher order sums are not calculated.

Figures 3A, 3B, 4:
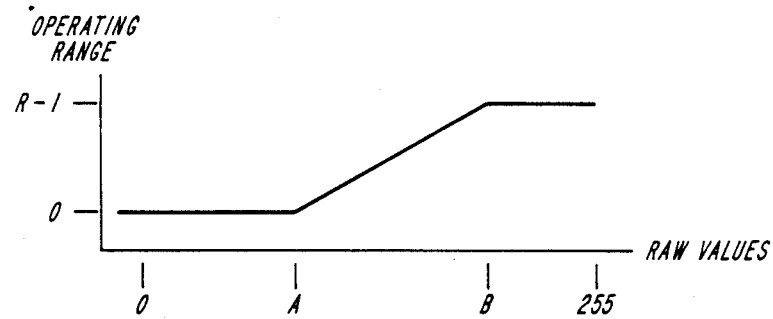
FIG. 3a and b illustrate a transform matrix utilized in conjunction with the method of FIG. 2.
FIG. 4 is a graph illustrating the level setting function of the image processor device of FIG. 1.
Figure 2:
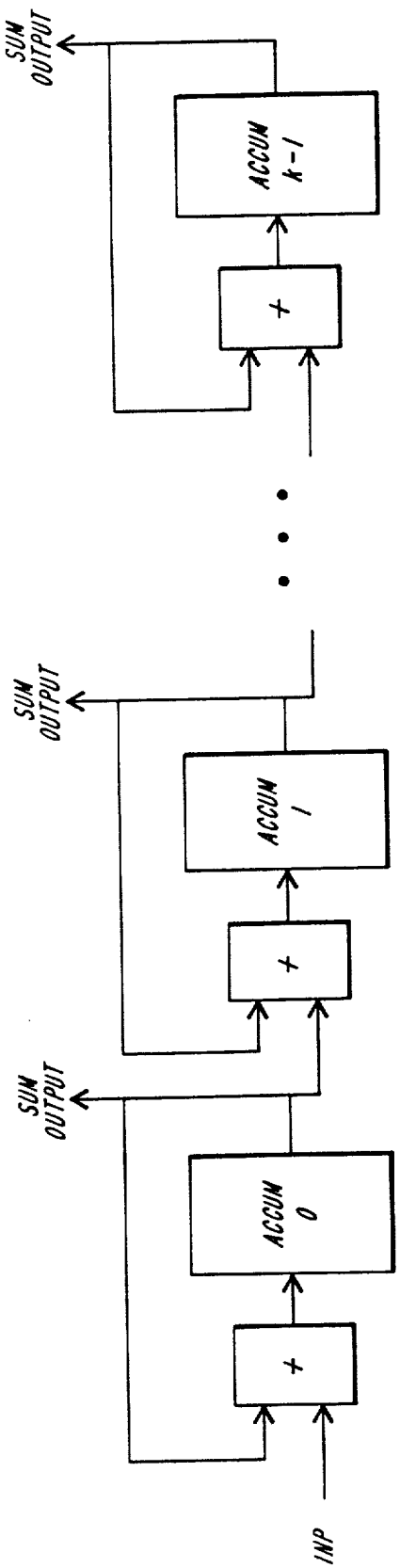

It can be shown that the final results in the k accumulators are a linear combination of the desired k moments. Thus, the actual moments can be computed by multiplying the k-vector of accumulators by a k by k matrix. The general form of the matrix is shown in FIG. 3a, and the specific example for k=3 is shown in FIG. 3b.

In many practical applications, the I and M pixels are limited in range, or number of grey levels, to considerably less than 255, so the corresponding E and C elements will not be used. In these cases, the moment generation is made much faster by starting the iteration with the highest array element that, based on the maximum value of the I or M pixels, might be nonzero.

It can be seen that to compute the first k moments of an array n elements long by direct application of Equation 1, above, requires (kn) additions and nk(k-1)/2 multiplications. Using the cascaded accumulator technique, the number of additions are the same but there are no multiplications. Since multiplications are in general much more expensive to provide than additions, the savings are considerable. The cost of performing the matrix multiply is low because the matrix multiply is only performed once and most of the matrix elements are zero or one.

In a preferred embodiment, the processor 12 performs all of the moment generation, using the processor's data registers for the accumulators.

The pixel operations required to convolve or correlate an image with a model, also referred to as a template or kernel, are the same; the model is lined up with the image in all or selected positions and at each such position the following formula is computed:

$$\sum_i I_i M_i, \quad (2)$$

where $M_i$ is the with model pixel, $I_i$ is the corresponding image pixel, and the sum is taken over all model pixels.

A related but more important machine vision function is normalized correlation which is computed by the following formula (the summation index is omitted for convenience):

$$r^2 = \frac{[n\Sigma(IM) - \Sigma(I)\Sigma(M)]^2}{[n\Sigma(I^2) - \Sigma^2(I)][n\Sigma(M^2) - \Sigma^2(M)]} \quad (3)$$

where each summation is the sum over all image/model pixel pairs and n is the total number of model pixels. Thus, to compute normalized correlation, the following sums are required:

$\Sigma(1)$, $\Sigma(I)$, $\Sigma(M)$, $\Sigma(I^2)$, $\Sigma(M^2)$, and $\Sigma(I\,M)$.

Since the sums that depend only on the model need be computed only once, only those sums that depend on the image have to be computed at each correlation position. They are $\Sigma(I)$, $\Sigma(I2)$, and $\Sigma(I\,M)$.

As described above, computing convolution or simple correlation involves the same pixel operations, except that only ҍ(I M) is needed.

Although it appears that multiplications are required on a per-pixel basis to compute the above quantities, the fact that the image and model pixels take on a limited range of values (0 to 255 or less in one embodiment of the invention) can be exploited to eliminate the multiplications. The method is to factor the sum of the products into terms associated with the particular pixel value, and then sum those terms over all pixel values In a system utilizing a 256 element E array, the following derivation is used:

$$\sum_i I_i M_i^k = \sum_{j=0}^{255} \left[ j^k \sum_i I_i \delta(M_i - j) \right] \quad (4a)$$

$$= \sum_{j=0}^{255} j^k C(j) \quad (4b)$$

$$= C_k \quad (4c)$$

Here $\simeq$ is the discrete delta function:

$$\delta(n) = \begin{cases} 1 \text{ if } n = 0, \\ 0 \text{ if } n \neq 0. \end{cases}$$

The sum of products on the left side of Equation 4a is a sum over all image/model pixel pairs, and is a generalization of the sums required for convolution or correlation. This sum is factored into a sum over all model pixel values (j) on the right side of 4a. This process is referred to as the factorization step. The inner summation over all image/model pixel pairs (i) sums only those image pixels whose corresponding model pixel value is j. Summing those sums over all values of (j) produces the left side of Equation 4a.

The inner summation, the sum of all image pixels whose corresponding model pixel has a given value (j), is precisely what the illustrated system computes in array element C(j) as shown in equation 4b. Finally, referring to equation 1, the original sum is simply the kth moment of C.

For convolution or correlation, the only terms of interest are $C_0 = $ ҍ(I) and $C_1 = $ ҍ(I M).

A similar argument shows the relationship between the moments of the E array and the original image:

$$\sum_i I_i^k = \sum_{j=0}^{255} \left[ j^k \sum_i \delta(I_i - j) \right] \quad (5a)$$

$$= \sum_{j=0}^{255} j^k E(j) \quad (5b)$$

$$= E_k \quad (5c)$$

Thus, to compute the sums needed for convolution or correlation, there are two steps. In the first step, that of factorization, the microprocessor 12 references image/model pixel pairs with the appropriate address tags, resulting in the inner sums of equations 4a and 5a appearing in the C and E arrays 26 and 24. The M FIFO 20 operates in FIFO mode—5 clock cycles per pixel best case. In the second step, the first 2 moments of C are generated. For normalized correlation, the first 3 moments of E are also generated.

The illustrated device is very efficient in reducing the number of per-pixel operations, as shown in the following table:

|  | convolution | | normalized correlation | |
| --- | --- | --- | --- | --- |
|  | multiplies | adds | multiplies | adds |
| prior art | 1 | 1 | 2 | 3 |
| invention | 0 | 1 | 0 | 2 |

For normalized correlation, the illustrated system eliminates the two expensive multiplies and one of the three adds. Furthermore, the two remaining adds require fewer bits of precision than would be required the traditional way. For example, one of the adds is simply an increment (the operation on the E array). This reduced precision requirement can be used to further lower the cost of implementation, for example by allowing one to use the serial adder scheme described above. If implemented in VLSI, the invention would use fewer transistors for its additions than would the traditional technique.

In order to achieve its efficient per-pixel performance, the illustrated system must perform an additional calculation at each convolution or correlation position: moment generation. The time needed for moment generation is proportional to the number of grey levels in use. Thus, the maximum benefit of the invention occurs when the time for the first step, which is proportional to the model size, is comparable to or larger than the time for moment generation. Using the invention for a 3×3 convolution with 256 levels of grey would be inefficient. In practice, however, larger models are important, and the number of grey levels needed can be dramatically reduced.

In most practical machine vision applications, it is sufficient to use approximately 24 image grey levels and 16 model grey levels for correlation operations. The models used in such operations range in size from 5×5 to 256×256.

When using a reduced number of grey values (as compared to the range of values that the image sensor can provide), the T array 22 is used to map image values into the operating range for the correlation operation. Thus, one function of the T array is to reduce the number of required gray levels. This pixel mapping adds no per-pixel or per-correlation-position time to the operation—the T array 22 is computed no more than once per image. The model's pixel values are similarly mapped from raw sensor values at the time the model is created. Thus, during a correlation operation, the memory 14 holds raw image values and mapped model values.

The mapping of raw pixel values is illustrated in FIG. 4. Referring to FIG. 4, R is the number of grey levels in the operating range, and A and B represent the range of raw values actually used in a given image. The A and B values are the smallest and largest pixel values left after discarding the (t) smallest and (t) largest values in the image. (t) is a parameter selected according to the application to eliminate statistically insignificant values, and is typically between 1 and 5 percent of the number of pixels in the image, but not exceeding 100 pixels.

The easiest and fastest way to compute A and B is from a histogram or pixel distribution of the image. A histogram gives the number of pixels in the image at each of the possible pixel values. This is simply the contents of the E array.

In a preferred embodiment of the inventon, considerable care is taken to insure that the per-pixel time is close to the theoretical best case of five clock cycles per pixel. Images and models are stored in memory as rectangular arrays of pixels; non-rectangular models can be made using "don't care" codes (M=255). Each row in an image has the same odd/even address alignment; all model rows are even aligned, with a "don't care" at the end of the row if necessary to make the row length even. The goal is to process each row with a sequence of cmpm. 1 instructions. Since those instructions process four even-aligned pixel pairs, adjustment must be made for the cases where the row length is not divisible by four and where the starting image address for a given convolution or correlation position is odd.

Thus, there are a total of eight cases for processing the rows at a given convolution or correlation position: the two odd/even alignment conditions for the starting image pixel, times the four possible remainders of row length divided by four. The simplest case is even alignment, remainder=0; the code for such a case is as follows:

|      |        |                    |                              |
| ---- | ------ | ------------------ | ---------------------------- |
| *    | d0     | image address update to get from end of one row to beginning of text | |
| *    | d1     | row count          |                              |
| *    | a1     | model address + M pixel tag |                     |
| *    | a2     | image address + I pixel tag |                     |
| 100: | cmpm.1 | (a1)+, (a2)=       | * 64 cmpm.1's to handle      |
|      | :      |                    | * model rows up to 256       |
|      | :      |                    | * pixels in length           |
|      | cmpm.1 | (a1)=, (a2)=       | * branch offset of dbf       |
|      | add.1  | d0,a2              | * is adjusted based on       |
|      | dbf    | d1                 | * the model row length       |

Since rows with odd length are padded with a "don't care" code at the end, this code can also be used for the remainder =3 case, even or odd alignment. For even alignment, the device simply computes the branch offset for the dbf as if the row was one pixel longer. For odd alignment, the M FIFO is preloaded with one "don't care" pixel and the starting image address decremented to make it even before entering the loop. The preloaded "don't care" code causes the device to ignore the even pixel at the start of each row. At the end of each row, one M pixel is left over in the FIFO—the "don't care" that pads the row to even length. That "don't care" becomes the preloaded "don't care" for the next row.

A second loop is used for the case of even alignment, remainder=2 and for the case of even or odd alignment, remainder =1. The code is identical to the above except that a cmpm.w (a1)+,(a2)+ replaces the last cmpm.1 to handle the two left over pixels.

The code for the odd alignment, remainder =0 case is:

|      |    | same register use as above, plus: |                    |
| ---- | -- | -- | ---- |
|      |    |    |      |
|      |    | a4 | address of a don't care + M pixel |
| tag 200: |    | cmpm.1 (a1)+, (a2)+ |      |
|      |    | :  |      |
|      |    | :  |      |
|      |    | cmpm.1 (a1)+, (a2)+ |      |

|      |                |
| ---- | -------------- |
|      | test.b (a2)+   |
|      | add.1 d0, a2   |
| 201: | test.b (a4)    |
|      | dbf d1,200     |

This is similar to the above odd alignment cases in that a "don't care" code is preloaded. The difference is that since the row length is even, there is no "don't care" code at the end of each model row, so it is fetched from somewhere else: the tst.b (a4) instruction. The starting image address is decremented to make it even and enter the loop at the label "201". The branch offset of the dbf instructions is adjusted based on the row length.

The final case, odd alignment, remainder =2, is identical to the above loop, except that the last cmpm.1 is replaced with a cmpm.w.

An important special case of the above convolution and correlation operations involves models with only 2 grey levels (0 and 1), called binary models. It is important because many practical applications use binary models, and execution is accelerated by operating the M FIFO 20 in pattern mode. Furthermore, unlike the implementation described above, the time spent processing model "don't cares" is eliminated.

The M FIFO 20 is preloaded with all 0's so that the sum of all I' values appears in the array element C(0). Next, each image pixel whose corresponding model pixel is 0 is referenced, and the resulting sum is read out of C(0) and saved. Finally, each image pixel corresponding to a model 1 is referenced and again the sum is read out of C(0). The 0th moment of C is the sum of the two values read out of C(0); the 1st moment is simply the second value read out. The moments of the E array are generated as usual. Image pixels corresponding to model "don't cares" are not referenced.

With this technique, the sequence of pixel references is much more complex than the previous implementation, where pixels were referenced at contiguous addresses. In order for this technique to operate at high speed, the complex reference pattern must be generated faster, on the average, than 5 clock cycles per pixel. The fact that 0's and 1's in the model tend to come in contiguous clusters is exploited. A model with alternating 0's and 1's would be much slower to process than 5 clock cycles/pixel.

Maximum speed for binary models is attained by representing the model as a sequence of microprocessor instructions that, when executed, reference the image pixels corresponding to model 0's followed by model 1's, at a given convolution or correlation position. Each model has two such representations, one for use when the starting image address is even, and the other for odd. The two representations are called the even and odd phases of the model.

The program that converts a model to the binary representation is called the model compiler. The model compiler assumes that (d0) holds the image address update to get from the end of one row to the beginning of the next, and that (a2) holds the address of the first image pixel. (a2) is updated as the compiled model runs. The following table shows all instructions generated by the compiler and the situation in which each instruction is used:

| | | |
|---|---|---|
| add.1 | d0, a2 | skip to next row |
| addq.1 | #x,a2 | skip x pixels, x < = 8 |
| lea | x(a2), a2 | skip x pixels, x > 8 |
| lea | x(a2, d0), a2 | skip one row and x pixels, x < 128 |
| tst.b | (a2)+ | reference 1 pixel |
| tst. w | (a2)+ | reference 2 even-aligned pixels |
| cmpm.b | (a2)+, (a2)+ | reference 2 odd-aligned pixels |
| tst.1 | (a2)+ | reference 4 even-aligned pixels |
| cmpm.1 | (a2)+, (a2)+ | reference 8 even-aligned pixels |
| tst.b | x(a2) | skip x and reference 1 isolated pixel |
| tst.w | x(a2) | skip x and reference 2 even-aligned isolated pixels |
| tst.1 | x(a2) | skip x and reference 4 even-aligned isolated pixels |

In addition to the above, the model compiler generates instructions to save the C(O) values and compute the C moments.

Another image processing function, spatial averaging, takes an image W by H pixels in size, partitions it into adjacent, non-overlapping blocks J by K pixels in size, and produces an image W/J by H/K pixels where each pixel is the average of all of the pixels in the corresponding block of the input image. Spatial averaging is the central operation in a broad class of machine vision strategies known as resolution pyramids. It is useful in speeding up operations by making smaller images in cases where the original image is over resolved. Because averaging tends to reduce random noise, spatial averaging can be used to trade off spatial resolution for grey level resolution.

To implement spatial averaging, the C array is used to sum the pixels in each J by K block. First, a row of model pixels is created that maps the input image pixels to output pixels corresponding to elements of C—J (0)'s, followed by J (1)'s, followed by J (2)'s, up to J (W/J - 1)'s. If the rows of the input image are odd aligned, a "don't care" is inserted at the beginning of the model row. The model row is padded at the end with "don't cares", so that its length is divisible by 8. This allows cmpm.l instructions to be used without concern about boundary conditions.

Once the model pixels are created, the device references the image/model pixel pairs. Each row of the image is referenced with the one model row. After each K rows of the input image are processed, the next row of the output image is written by reading the C array and dividing each value by J*K. The M FIFO operates in FIFO mode at 5 clock cycles ticks/pixel.

If the output image rows are longer than 255 pixels, the spatial averaging operation must be split up into vertical strips so that the output from each strip fits into the 255 available C elements.

In a preferred embodiment of the invention, two improvements speed processing. First, the input image is processed in strips of 8 columns. The M FIFO 20 can then operate in pattern mode because the M pixel value is the same for all I pixels of a column. The method is to reference 8 model pixels with a cmpm.1, then the corresponding K rows of 8 columns of image pixels, then the next 8 model pixels, and so on. There is a problem with this method, however. First, although the 68000 microprocessor can reference consecutive pixels in a row quickly, there is a time penalty for going down columns. The penalty is just under one clock cycle/pixel if there is a constant address difference between the rows, as is the case for the images used for convolution and correlation. However, many input images have row addresses indicated by an array of pointers. In these cases, the time penalty for going down columns is much greater.

A compromise that works well in practice is to use a separate address register for each image row. With this approach, there is no penalty for going down the columns. There are not enough address registers in general to cover the K rows, so 4 address registers are assigned to the image rows and the K rows are processed in strips of four, plus one optional remainder strip of 1 to 3 rows. Once the K rows are processed, the next output row is read out of the C array 26.

The second improvement eliminates the very expensive operation of dividing by J*K per output pixel. The constant 1/J*K is broken into a multiplier between 0.5 and 1.0, and a shift count. For example, if J*K =25, then the multiplier is 16/25, or 0.64, and the shift count is four. The T array 22 is configured to multiply the I pixels by the multiplier and the divide is replaced with a right shift. The effect is to lose up to 1 bit of precision on the input pixels but to save approximately 10 microseconds per output pixel.

A histogram is the distribution of image pixel values, or the number of instances of each pixel value in an image. Histograms have a variety of uses, including the grey level range reduction operation described above. With the moment generating function, useful image statistics can be derived from a histogram, including mean and variance.

Almost any image processing operation performed with the device computes a histogram of the input image, as mapped by T, in the E array. A histogram can be computed by itself at the rate of 3 clock cycles/pixel, or in conjunction with other operations. For example, one can copy an image in memory while the device computes a histogram in parallel.

A projection of an image onto a line is a 1-dimension function whose value at a given point is the sum of the image pixels normal to the line at the point. For example, a row (or Y) projection is $$P_{row}(Y) = \sum_{x} I(x,y)$$

A column (or X) projection is similarly the sum of all columns. In general, a projection can be made at any angle.

Projections have a variety of uses in image processing. For example, when combined with the moment generating functions, areas, center of mass, and principal moments and axes of inertia can be computed.

Row projections are the simplest output to compute with the device. The M FIFO 20 is operated in pattern mode and preloaded with all 0's. Each image row is referenced, and the sum appears in C(0). A row projection can be computed in parallel with a histogram and/or a copy operation.

A column projection is very similar to a spatial averaging operation where J=1, K=H, and the output is not divided by J*K. Using the 4 address register technique described above, the projection can be produced at nearly 3 clock cycles per pixel.

Arbitrary projections can be computed at 5 clock cycles/pixel. One row of M pixels is computed that maps each image pixel into the appropriate bin of the projection: $M(x) = \cos(\theta)$, where $\theta$ is the angle of the projection. For each row of the image, the model pixels begin at at $x = y \sin(\theta)$. These numbers must be rounded off to the nearest integer, and boundary and odd/even alignment conditions must be adjusted for.

The illustrated system can also execute image filtering. In the general case, convolution of an image with a specific kernel can be used to filter the image; that is, amplify or attenuate selected spatial frequencies. Such a filter is called a discrete, finite impulse response, spatial filter. The choice of coefficients of the kernel determines the frequency response of the filter.

As described above, a system according to the invention can be used to convolve an image with a kernel, assuming that the kernel coefficients can be represented by small integers. Although the derivation shown in Equation 4 assumes that the coefficients (i.e., model pixels) are non-negative integers, it is a simple matter to generalize this to handle negative and fractional coefficients, as long as the total range and precision of the coefficients can be represented by the number of bits available for the model pixels. The generalization to negative coefficients requires a slight modification of the the moment generation step, specifically initializing accumulator zero to an appropriate value. The generalization to fractional coefficients requires dividing the convolution output values bY a scale constant.

As described above, the invention is more efficient than traditional convolution techniques for large kernels with a small range of coefficient values. For convolution, the number of grey levels in use in the image does not affect processing time, because the moments of the energy array are not needed.

Although correlation according to the invention is more efficient than prior art techniques, both approaches are very expensive since both must process every image/model pixel pair at every convolution position. Thus, the processing time is proportional to the product of the number of model pixels and the number of convolution positions. The following is a description of a technique for convolution where the processing time depends only on the number of convolution positions. This is referred to as a "constant time filter," because the processing time is independent of model size.

In order to achieve the performance benefits of a constant time filter, it is necessary to severely restrict the choice of kernel coefficients. In particular, the kernel must be specified as the sum of one or more rectangular arrays of constant values. Each such array can be of any size and can be at any position relative to the other arrays. The processing time is proportional to the product of the number of arrays and the number of correlation positions. Thus, specifying an arbitrary kernel as the sum of many arrays of size one by one degenerates to the same computational complexity as traditional convolution.

The practical benefits of constant time filters arise from the observation that in many cases the qualitative behavior of a filter is much more important than its quantitative behavior. In these cases the filter is used to achieve one of the following results: smoothing (low-pass filter); edge enhancement (high-pass filter); or some combination thereof (band-pass filter). Although many different kernels can be used for smoothing, for example, and although a kernel can be designed that is optimal according to some criteria, it is often better to have a fast smoother than an optimal smoother. Furthermore, it is almost always better to have a filter whose size can be adjusted without penalty than to have one that allows arbitrary coefficients but is restricted to a small fixed size, such as three by three.

A constant time filter based on one array will act as a low-pass filter. The frequency response is controlled by adjusting the size of the kernel. The constant value for the coefficients is usually chosen so that the coefficients sum to one. A high-pass filter can be made simply by subtracting the output of a low-pass filter from the original image.

The kernel for a constant time band-pass filter is the sum of two arrays: an array of positive values centered in a larger array of negative values, such that all of the coefficients sum to zero. Once again, the frequency response of the filter is controlled by adjusting the size of the arrays.

To implement a constant time filter, the image is convolved with each of the arrays that make up the kernel, and the results are summed. Thus, the method reduces to a procedure for convolving an image with a rectangular array of constant values. The method is based on two observations: first, that convolution with a rectangular array of constant values is separable into two one-dimensional convolutions; second, that once the convolution value at a given position is known, the value at an adjacent position can be computed by adding to the original value the difference between the image values at the leading and trailing edge of the convolution position.

The following example illustrates implementation of constant time filters according to the invention. Assume a rectangular image I (x,y) that is W by H pixels, and a smaller rectangular array of M by N constant values. The convolution output will be (W−M+1) by (H−N+1) pixels. A digital signal processor according to the invention, utilizing the image pixel subtraction improvement described above, is then utilized in a mode where the C array elements are not cleared after reading. The procedure is as follows:

1. Sum the first N elements of each of the W columns of the image. The device is used to compute the sums, as described above in connection with computing column projections. The column sums are left in the C array. Let j=0.

2. Sum the first M elements of the C array. Call the result S. Let i=0. In a preferred embodiment of the invention utilizing a Motorola MC68000 processor, the sum is held in a data register of the processor.

3. Multiply S by the constant value of the convolution array. The result is the next convolution output value.

4. If i+M <W then add to S the value C(i+M)−−C(i); add 1 to i, and go to step 3. Otherwise, go to step 5. In a preferred embodiment, two address registers are used to point to C(i+M) and C(i), and auto-incrementing addressing mode is used to fetch the values from the C array.

5. If j+N=H, the execution is complete. Otherwise, update the C array for the next row by adding to each element C(i) the value I(i, j+N)−I(i,j); add 1 to j, and go to step 2. In a preferred embodiment, one address register (a1) is used to point to row j, one address register (a2) is used to point to row j+N, and one address register is used to point to an array of W model pixels whose values are 0 through W-1. In such an embodiment, a0 is set to tag data references as M pixels, a1 tags data references as I pixels to be subtracted from C, and a2 tags data references as I pixels to be added to C. The following program code fragment utilized in connection with such an embodiment will update 8 columns in 60 clock cycles:

cmpm. 1 (a0)+, (a1)+ cmpm. 1 (a0)+, (a1)+ cmpm. 1 (a2)+, (a2)+

The M FIFO is operated in FIFO mode for the first two instructions and in pattern mode for the third instruction.

If W is larger than the number of elements in the C array, the image is divided into strips that are narrow enough to fit into the C array These strips must overlap by M-1 columns.

It can be seen from all of the above examples that the principal function of the invention is one of pixel grouping—grouping pixels into bins corresponding to template values or spatial coordinates. Although the most important applications have been discussed above, many more are conceivable. For example, the device can compute polar projections of an image about a point—the sum of image pixels as a function of distance (R) or direction (Θ). All that is required is to precompute an array of model pixels that maps each image pixel into the appropriate bin.

The illustrated embodiments described above utilize a combination of hardware and software modules to execute the noted signal processing functions. However, those skilled in the art will understand that many of the functions described above could be executed in purely hardware or software implementations. The embodiments described above are preferred because they offer a significant cost-effectiveness advantage over equivalent embodiments implemented entirely in hardware or software.

The preceding description sets forth embodiments of the invention practiced in connection with an image processing device. It will be apparent to those skilled in the art, however, that the invention can also be practiced in any of a variety of digital signal processing implementations, including those relating to audio, radar, and other signal generating applications.

It is intended that all matter in the description and drawings be interpreted as illustrative and not in a limiting sense. Those skilled in the art may have changes described in the embodiment, and other teachings herein, for further practices which are within the scope of the invention described and claimed herein.

It is also to be understood that the following claims are intended to cover all of the generic and specific features of the invention as described herein, and all statement of the scope of the invention which, as a matter of language, might be said to fall therebetween.

Having described the invention, what is claimed as new and secured by letters patent is:

1. Image processing apparatus comprising
    image input means for receiving an image signal stream, said image signal stream including one or more digital image values representative of pixels of an input image,
    model input means for receiving a model signal stream including one or more digital model values representative of pixels of a model, ones of said digital model values being received in temporal correspondence with ones of said digital image values so that ones of said digital model values correspond to ones of said digital image values,
    first memory means, in electrical communication with said image input means, and including an array of first memory locations, for accumulating energy values representative of frequency of occurrence of said digital image values, and wherein said memory locations of said first memory means are addressable by said image values,
    second memory means, in electrical communication with said model input means, and including an array of second memory locations, for accumulating correlation values representative of results of arithmetic operations on said image values, and wherein said memory locations of said second memory means are addressable by said model values,
    first arithmetic means, in electrical communication with said first memory means and said second memory means, for performing arithmetic functions on said energy and correlation values, said arithmetic means including
    incrementer means, in electrical communication with the first memory means, for incrementing the energy value stored at each first memory location addressed by said image values, and
    adder means, in electrical communication with the second memory means, for adding, to the correlation value stored at each second memory location addressed by a received model value, the image value corresponding to the received model value, to generate output image values, and
    controller means in electrical communication with said arithmetic means for controlling the arithmetic functions of said arithmetic means, said controller means including execution means for causing said arithmetic means to execute said incrementation and addition functions on corresponding ones of said energy and correlation values.

2. Apparatus according to claim 1, wherein said arithmetic means further includes means for subtracting, from the correlation value stored at each memory location of said second memory means addressed by a received model value, the digital image value corresponding to the received model value.

3. Apparatus according to claim 2, wherein said first arithmetic means includes means for executing constant time filter functions, and
    said controller means contains means for placing said first arithmetic means in a state to execute constant time filter functions.

4. Apparatus according to claim 1, wherein said digital image values are characterized by an 8 bit width,
    said digital model values are characterized by an 8 bit width,
    said first memory means includes 256 locations characterized by a 16 bit width, and
    said second memory means includes 256 locations characterized by a 24 bit width.

5. Apparatus according to claim 1, wherein said controller means is contained in a microprocessor.

6. Apparatus according to claim 1, further comprising
    translation memory means, in electrical communication with said first memory means and said second memory means, and including an array of translation memory locations, said translation memory locations being addressable by ones of said digital image values, for translating input image values from a first range of values to a second range of values.

7. Apparatus according to claim 6, wherein said translation memory means includes means for translating input image values from a first range of grey levels to a second range of grey levels, said second range of grey levels being smaller than said first range of grey levels.

8. Apparatus according to claim 1, wherein said controller means includes second arithmetic means for computing moments of values stored in at least one of said first memory means and said second memory means.

9. Apparatus according to claim 8, wherein said second arithmetic means is contained in a microprocessor.

10. Apparatus according to claim 9, wherein said microprocessor contains model compiler means for executing correlation, normalized correlation and convolution functions utilizing binary models.

11. Apparatus according to claim 8, wherein said second arithmetic means includes means for executing moment functions utilizing cascaded accumulators.

12. Apparatus according to claim 8, wherein said first and second arithmetic means collectively include means for executing correlation, normalized correlation, and convolution functions, and
    said controller means includes means for placing said first and second arithmetic means in a state to execute correlation, normalized correlation and convolution functions.

13. Apparatus according to claim 1, wherein said first arithmetic means includes means for executing spatial averaging functions, and
    said controller means contains means for placing said first arithmetic means in a state to execute spatial averaging functions.

14. Apparatus according to claim 1 wherein said controller means contains means, in electrical communication with said first memory means, for utilizing the energy values accumulated in said first memory means to generate histograms, said energy values being representative of frequency of occurrence of said digital image values.

15. Apparatus according to claim 1, wherein said controller means contains means for controlling the incrementer means and adder means of said first arithmetic means to generate projections from said digital image values and said digital model values.

16. Apparatus according to claim 15, wherein said controller means contains spatial moment means for executing spatial moment functions, said spatial moment means including
    second arithmetic means for computing moments of values stored in at least one of said first memory means and said second memory means.

17. Image processing apparatus comprising
    first input means for receiving a first signal stream including one or more first digital signal values representative of pixel of an input image,
    second input means for receiving a second signal stream including one or more second digitial signal values representative of pixels of a model, ones of said second digital signal values being received in temporal correspondence with ones of said first digital signal values so that ones of said second digital signal values correspond to ones of said first digital signal values,
    memory means, in electrical communication with said first and second input means, for storing sums of arithmetic products of said first digital signal values and said second digital signal values in an array of memory locations, said memory locations being addressable by said second digital signal values, and
    execution means, in electrical communication with said first input means, said second input means, and said memory means, for executing arithmetic operations on said first digital signal values and said second digital signal values to generate output digital signal values representative of an output image, said arithmetic operations including any of correlation, normalized correlation and convolution, said execution means including
    arithmetic means for computing said stored sums, said arithmetic means including
        factorization means for factoring arithmetic products of said first digital signal values and said second digital signal values, and
        moment generation means, in electrical communication with said execution means, for computing moments of said array.

18. Apparatus according to claim 17, wherein said second arithmetic means includes means for generating said moments utilizing cascaded accumulators.

* * * * *

UNITED STATES PATENT AND TRADEMARK OFFICE
CERTIFICATE OF CORRECTION

PATENT NO. : 4,972,359

DATED : November 20, 1990

INVENTOR(S) : Silver et al

It is certified that error appears in the above-identified patent and that said Letters Patent is hereby corrected as shown below:

In the drawings, replace Figure 2 with the drawing attached herewith.

Column 3, lines 11-12, replace "and incorporated herein as Appendix A" with -- in Appendix A filed with the application for this patent --.

Column 4, line 57, replace "cmpm.](a0)+,(a1)+" with -- cmpm.1 (a0)+,(a1)+ --.

Column 6, line 60, replace "$\natural(1), \natural(I), \natural(M), \natural(I^2), \natural(M^2),$ and $\natural(I\ M)$." with -- $\Sigma(1), \Sigma(I), \Sigma(M), \Sigma(I^2), \Sigma(M^2),$ and $\Sigma(I\ M)$. --

Column, 6, line 66, replace "$\natural(I), \natural(I2),$ and $\natural(I\ M)$." with -- $\Sigma(I), \Sigma(I^2),$ and $\Sigma(I\ M)$. --

Column 7, line 3, replace "$\natural(I\ M)$" with -- $\Sigma(I\ M)$ --.

Column 7, line 24, replace "Here $\simeq$" with -- Here $\delta$ --.

Column 7, line 48, replace "$C_0=\natural(I)$ and $C_1=\natural(I\ M)$." with -- $C_0 = \Sigma(I)$ and $C_1 = \Sigma(I\ M)$. --

Column 13, line 24, replace "bY" with -- by --.

UNITED STATES PATENT AND TRADEMARK OFFICE
CERTIFICATE OF CORRECTION

PATENT NO. : 4,972,359

DATED : November 20, 1990

INVENTOR(S) : Silver et al

It is certified that error appears in the above-identified patent and that said Letters Patent is hereby corrected as shown below:

Column 9, line 13, replace "cmpm. 1" with -- cmpm.1 --.

Column 9, line 31, replace "(a2)=" with -- (a2)+ --.

Column 9, line 34, replace "(a1)=, (a2)=" with -- (a1)+, (a2)+ --.

Column 9, line 65, replace "tag200" with -- 200 --.

Signed and Sealed this

Thirtieth Day of June, 1992

Attest:

DOUGLAS B. COMER

*Attesting Officer*      *Acting Commissioner of Patents and Trademarks*